7340X
H. Crenshaw,
Water Wheel,
Patented Dec. 28, 1832.
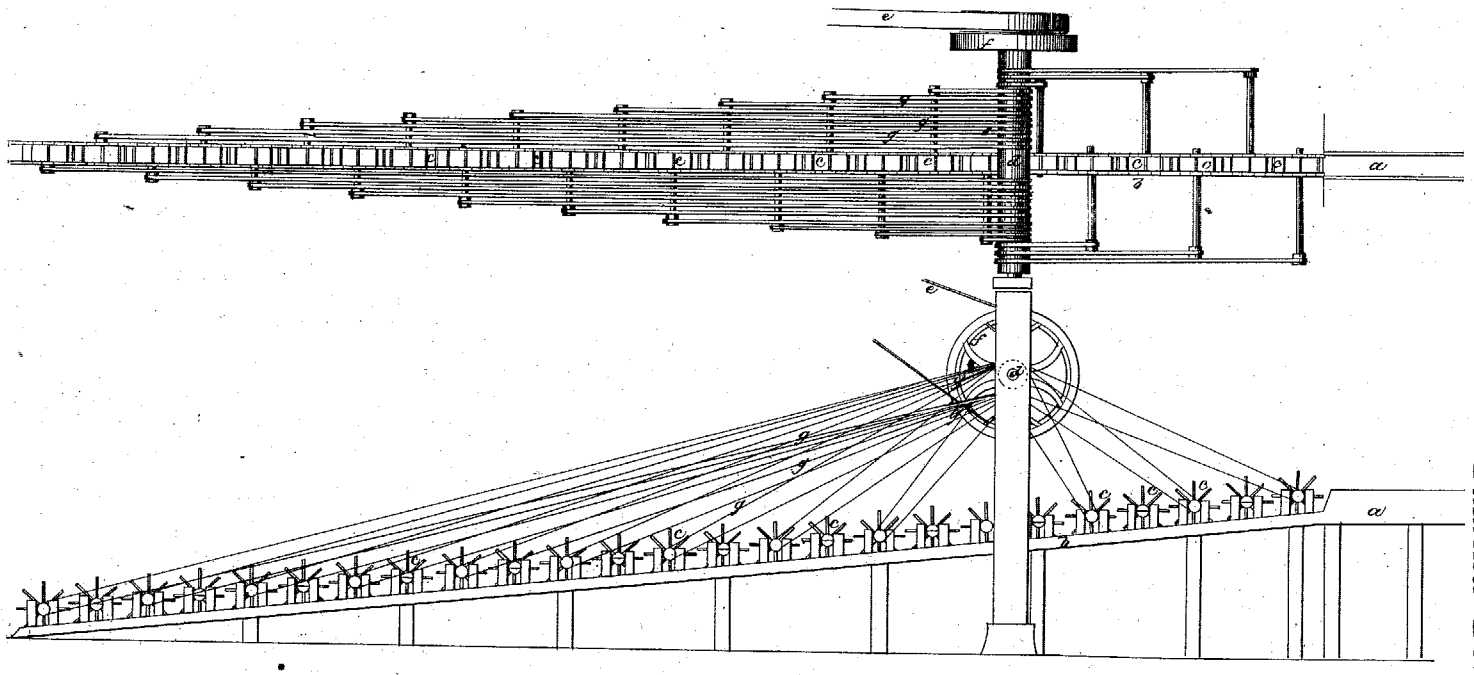
N. PETERS, PHOTO-LITHOGRAPHER, WASHINGTON, D. C.

[illegible] 74

7340X Dec. 28. 1832 [illegible]

Henry Crenshaw
Letters Patent

The schedule referred to in these Letters Patent and making part of the same containing a description in the words of the said Henry Crenshaw himself of his Improvement in Machinery, consisting in the repeated application of water to a number of Wheels in succession called "Crenshaw's Multiplied Water Power"

---

To all to whom these presents shall come: Be it known that I Henry Crenshaw of the District of Anderson in the State of South Carolina have invented a new and useful improvement in machinery consisting in the repeated application of water to a number of wheels in succession the name of which invention may be "Crenshaw's Multiplied Water Power" and that the following description of the construction and operation of the said Machinery as invented by me is as full as may be to illustrate the invention which consists rather in the principle of the repeated use of water on different wheels than in any peculiar or novel construction in machinery. The object of the invention is to convert small streams of water into use in carrying all sorts of machinery as sawing grinding, and the like. To illustrate as near as possible the application of the principles of the <u>Multiplied Water Power</u> let it be supposed that we have a volume of water one foot wide and one inch deep having a fall of ten feet perpendicular. This fall of ten feet will enable this volume of water one foot by one inch to be carried down an inclined plane for about one hundred feet in length. This inclined plane may be a race in which are to be placed small wheels varying from a foot to four feet in diameter, the [illegible] of the wheels being inversely as the size of them. The wheels are to run on their axles attached to upright posts or to the sides of the long trough or race. They are to have buckets or plain planks fitted so that they may fill the race say one foot wide. In a fall of ten feet making an inclined plane of about one hundred feet, there may be from twenty five [to] one hundred of these small undershot wheels carried by the weight & force of the water descending the race. Let a band pass from every one of these wheels to a shaft, to which

[illegible]

7340X shaft all the force of each one of the small water wheels is communicated. This
shaft may occupy any convenient position above the small wheels or at one
end of the race. The great shaft is to have a crank at one end if for a saw mill
or a cog wheel for a grist Mill, or a band wheel for any other purpose desir-
ed. it is also to have a heavy balance wheel to preserve a steady motion.
The above description is spoken in reference to what would most likely be
the number and the size of the water wheels in a stream of ten feet fall and
one foot by one inch of volume. but it is perceived that in the increase of the
quantity of water or of the fall of it an appropriate variation in the size and
number of the water wheels must follow. The model sent to the Patent of-
fice though different in respect to the number of wheels exhibits fully the
principle. The inclined race for the water to run in, the water wheels,
the shaft having a balance wheel and running in upright posts, and the
band connecting the small water wheels with the shaft, are all exhibited
in the model, besides also a crank adapting the machine to the use of a
saw mill is seen in the model. It may however be found necessary in or-
der to let the stream of water on several water wheels at once and get the
mill or machine started, that the buckets on the water wheels should
not be a solid plank, but that it should only be as broad as the water is deep
with arms reaching to their axles. The great superiority of these numerous
small water wheels over one large water wheel of [illegible] power equal to that
of all the small wheels consists principally in the acquisition of what
is exactly the desired velocity in water in turning grinding &c. I also
state that the afore said invention is a new discovery not [illegible],
and further that I made the discovery and perfected it in the [illegible]
[illegible] in December of the past year (18[illegible])

Witnesses
Thos. L. Ross
[illegible] Merrick

Henry Crenshaw

784 [illegible]